(12) United States Patent
Chiu

(10) Patent No.: US 8,379,943 B2
(45) Date of Patent: Feb. 19, 2013

(54) HIGH-PERFORMANCE FINGERPRINT IMAGE-PROCESSING METHOD

(76) Inventor: Li-Kuo Chiu, Taipei (TW)

( * ) Notice: Subject to any disclaimer, the term of this patent is extended or adjusted under 35 U.S.C. 154(b) by 923 days.

(21) Appl. No.: 12/473,304

(22) Filed: May 28, 2009

(65) Prior Publication Data

US 2010/0303310 A1 Dec. 2, 2010

(51) Int. Cl.
*G06K 9/00* (2006.01)
(52) U.S. Cl. .................................. 382/124; 382/260
(58) Field of Classification Search ............... 382/124, 382/260
See application file for complete search history.

(56) References Cited

U.S. PATENT DOCUMENTS

| | | | | |
|---|---|---|---|---|
| 6,222,641 B1 * | 4/2001 | Karidi | ............................ | 358/1.9 |
| 7,826,676 B2 * | 11/2010 | Porikli | ......................... | 382/260 |
| 7,889,950 B2 * | 2/2011 | Milanfar et al. | ............. | 382/300 |

OTHER PUBLICATIONS

Reisert et al., Complex Derivative Filters, IEEE Transactions on Image Processing [on-line], Dec. 2008, vol. 17, Issue: 12, pp. 2265-2274.*

Khan et al., Improved Fingerprint Identification using Directional Filter Banks, 7th International Multi Topic Conference, 2003 [on-line], Dec. 9, 2003, pp. 49-54.*

Geusebroek et al., Fast Anisotropic Gauss Filtering, IEEE Transactions on Image Processing [on-line], Aug. 2003, vol. 12, Issue:8, pp. 938-943.*

* cited by examiner

*Primary Examiner* — Matthew Bella
*Assistant Examiner* — Dennis Rosario
(74) *Attorney, Agent, or Firm* — Muncy, Geissler, Olds & Lowe, PLLC

(57) ABSTRACT

The present invention is a high-performance fingerprint image-processing method that use a composite filtering approach to perform the image enhancement through a combination of linear filtering and rhombus filtering after obtaining the determination for the fingerprint direction of fingerprint instead of the image enhancement performed in the frequency domain of the prior art; and then a binarizing step will follow to demonstrate the minutiae for image enhancement, also, the composite filter applied in the present invention can truly perform the image enhancement and mend the broken lines mainly focusing on each point in different fingerprint direction; furthermore, the present invention can use a filtering mask with a very low mask coefficient; thus, the filtering time and memory space can be significantly saved while the time spent and storage space occupied for image enhancement can be lessened largely.

4 Claims, 6 Drawing Sheets

HIGH-PERFORMANCE FINGERPRINT IMAGE-PROCESSING METHOD

BACKGROUND OF THE INVENTION

1. Field of the Invention

The present invention relates generally to a high-performance fingerprint image-processing method, and more particularly to a fingerprint image-processing method that uses the orientation-based line spatial filter and rhombus spatial filter as a tool to enhance the image in accordance with the fingerprint direction of fingerprint at each point.

2. Description of the Prior Arts

The development with respect to the technology of fingerprint recognition has been benefited from the electronic-integrated manufacturing technology and the researches toward a fast & reliable algorithm in association with a generation of hefty volume of data for recognition; therein, the procedure of fingerprint recognition system currently in existence is shown in the FIG. 6, and in one word, it indicates that the fingerprint recognition technology mainly relates to the fingerprint reading, image processing, minutiae extraction, data acquisition and matching. As shown in the figure, the image-processing technology; wherein, after acquiring the fingerprint image that is read from the human body through a fingerprint reading device, a further processing will follow to enhance the original image so that a clearer, low noise and high quality fingerprint image is obtainable; meanwhile, the quality of processed image will directly affect the fingerprint recognition rate; and generally speaking, the degradation of fingerprint image caused by the factors of external environment often leads to problems in minutiae extraction at the terminal and the bifurcation; for instances, a dry finger may cause broken or incomplete ridges to the center of fingerprint image that may be judged as islands during the feature extraction; and that is the reason why the originally acquired fingerprint images need to be further processed with an image enhancement for remedy of broken and incomplete ridges and with a filtering of noise in a bid to lessen the Fault Acceptance Rate (FAR) and Fault Rejection Rate (FRR) for fingerprint identification.

In accordance with the prior art, the technology of Gray-Scale Fingerprint Image Enhancement has two primary approaches in this regard; one of the approaches is to use the process of Fourier transform or the Wavelet transform, etc. to transform the image from the spatial domain to the frequency domain, perform a mask filtering in accordance with the frequency distribution and direction, and then transform it back to the spatial domain; apparently thus doing frequently is time-consuming when transforming the image back and forth between the spatial domain and the frequency domain, and unable to undertake the individual enhancement mainly focusing on every point and ridge in different direction in the spatial domain; instead, it has to perform an enhancement in all directions in the frequency domain and then to further select the correct directions to enhance the result in the spatial domain; such an operation takes a lot of time and occupy a great capacity of memory.

The other commonly used approach of Gray Scale Fingerprint Image Enhancement is to enhance the image directly in the spatial domain; for example, the Gabor like anisotropic filtering, Gaussian like mask for filtering or parallel ridge filtering; these spatial filtering masks generally have to go through many intricate processes to obtain the outcome while thus task is very time-consuming and usually needs to use a large mask space; not large enough mask space may result in a lower enhancing effect; that is to say, if the outcome of image enhancement is made by using merely a simple mask, then the connectivity at the breakpoints is usually much lower than the outcome from the enhancement in frequency domain; besides, if using a large mask space, then a problem of occupying too much memory capacity must occur consequently.

SUMMARY OF THE INVENTION

In order to solve the foregoing deficiency of the technologies currently in existence, the primary objective of the present invention is to provide a high-performance fingerprint image-processing method to mend the shortcomings with respect to the time-consuming and considerable occupation of memory capacity taken place in the existing technology when processing the image.

The primary objective of the present invention is attained by providing a high-performance fingerprint image-processing method that is comprised of the following steps:

determining the fingerprint direction being to apply numerical equations within a processor to further read and determine the fingerprint direction in part of characteristic ridges from a collected Gray-Scale image of an original fingerprint;

linear filtering of composite filtering being to apply definition equations of linear mask filter within the processor and to rotate a linear spatial filter within the processor based on the determined fingerprint direction in part to perform a filtering operation at each point on the collected fingerprint image;

rhombus filtering of composite filtering being to apply definition equations of rhombus mask filter within the processor and to rotate a rhombus spatial filter within the processor based on the fingerprint image, which has been linear filtered to perform a filtering operation at each point on the collected fingerprint image; and binarizing being to perform an binarizing operation for the fingerprint image that has been rhombus filtered by the processor in order to demonstrate the effect of image enhancement.

The present invention is able to combine the advantages of linear filter for its outstanding connectivity and the rhombus filter for its repair of breakpoints, and perform the image enhancement mainly focusing on every point in different fingerprint direction with a filtering mask coefficients less than 9×3 size used so that the filtering time and the memory space can be saved by lessening the operating coefficients.

DETAILED DESCRIPTION OF THE PREFERRED EMBODIMENTS

Figure 1:
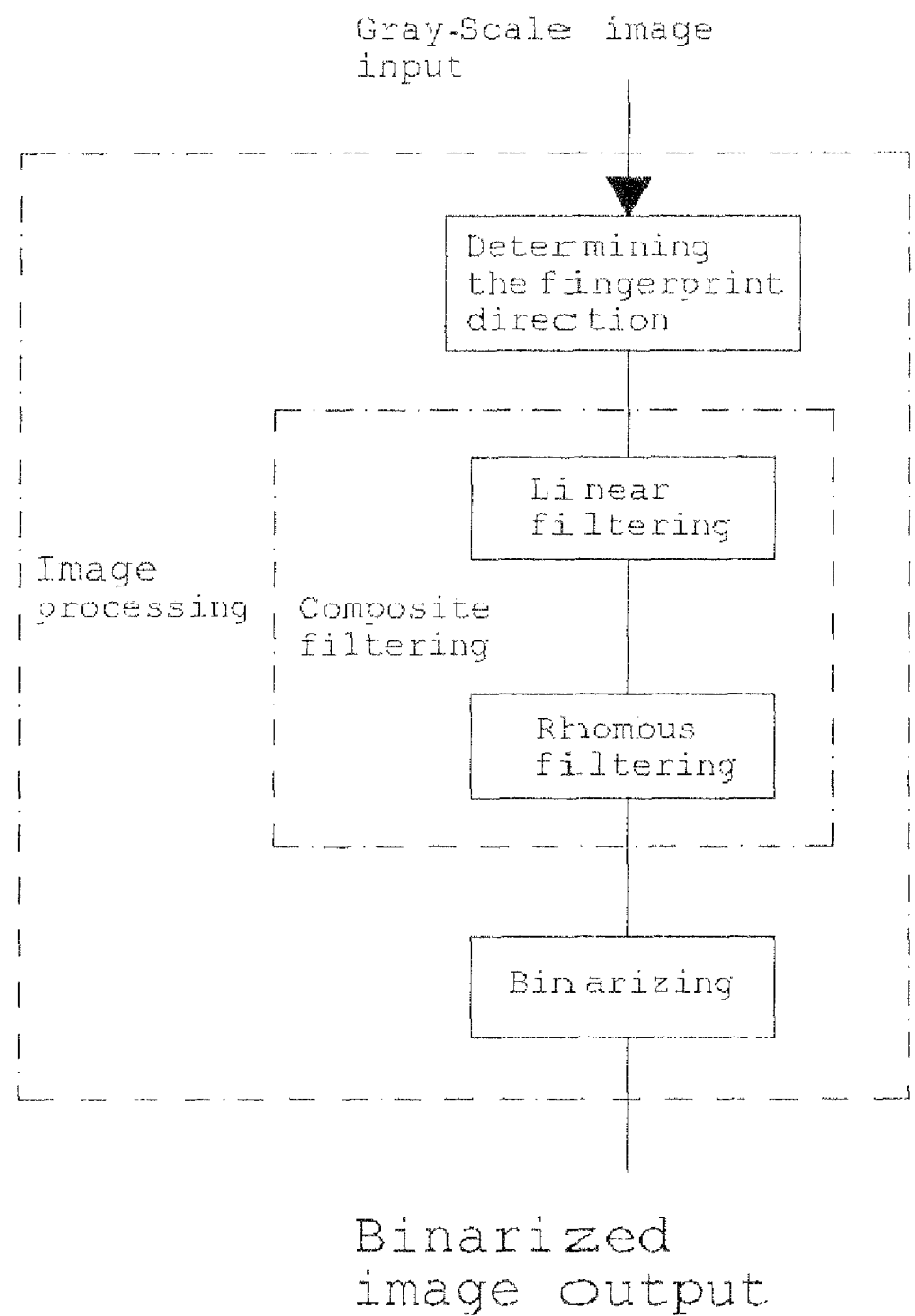
FIG. 1 is a flowchart of image processing in accordance with the present invention.

With reference to the FIG. 1, the high-performance image-processing method in accordance of the present invention is applied in the procedures of an auto fingerprint recognition system; uses a composite mask algorithmic operation within a computer processor to process the collected Gray-Scale fingerprint image and further transform the image into binarized image and comprises the following steps:
1. Determining the fingerprint direction
2. Linear filtering of composite filtering
3. Rhombus filtering of composite filtering
4. Binarizing, Step 1: Determining the fingerprint direction, the aforementioned Determining the fingerprint direction is to determine the fingerprint direction of the original fingerprint; that is, the alignment of the collected fingerprint in part shall be evaluated prior to the execution of operation for image enhancement by the processor so that the filtering mask can be applied to the fingerprint direction of acquired fingerprint to undertake the subsequent operations; since the method to obtain the minutiae from the fingerprint direction at each point in fingerprint has been a common technology, the method to determine the fingerprint direction of fingerprint proposed by Stock and Swonger is applied to the specification of processor used as the preferred embodiment of the present invention; thereof definitions of numerical equations are as follows:

$$S_0 = M(i,j+4) + M(i,j+2) + M(i,j-2) + M(i,j-4)$$

$$S_1 = M(i-2,j+4) + M(i-1,j+2) + M(i+1,j-2) + M(i+2,j-4)$$

$$S_2 = M(i-4,j+4) + M(i-2,j+2) + M(i+2,j-2) + M(i+4,j-4)$$

$$S_3 = M(i-4,j+2) + M(i-2,j+1) + M(i+2,j-1) + M(i+4,j-2)$$

$$S_4 = M(i-4,j) + M(i-2,j) + M(i+2,j) + M(i+4,j)$$

$$S_5 = M(i-4,j-2) + M(i-2,j-1) + M(i+2,j+1) + M(i+4,j+2)$$

$$S_6 = M(i-4,j-4) + M(i-2,j-2) + M(i+2,j+2) + M(i+4,j+4)$$

$$S_7 = M(i-2,j-4) + M(i-1,j-2) + M(i+1,j+2) + M(i+2,j+4) \quad (A)$$

Where, $M(i,j)$ in (A) equations are the Gray Scale value at each point in the fingerprint image M while $S_0, S_1, K, S_7$ are the summation of Gray Scale vale in each direction; also, $S_{max}$ and $S_{min}$ express the maximum and the minimum sum of Gray Scale values in every direction as shown in the (B) equations:

$$S_{max} = \max_{n=0,K,7} S_n \quad n = 0, K, 7 \quad (B)$$

$$S_{min} = \min_{n=0,K,7} S_i \quad n = 0, K, 7$$

According to the results from the foregoing computation, the fingerprint direction & minutiae of fingerprint at each point can be determined; furthermore, set $\theta(i,j)$ as the fingerprint direction angle of the point $M(i,j)$ and apply the following (C) equations to determine the correct direction $S_d$ in accordance with the $M(i,j)$, $S_{max}$ and $S_{min}$ at point $(i,j)$ and then follow to calculate the angle $\theta(i,j)$ at point $(i,j)$:

$$S_d = \begin{cases} S_{max} & \text{if } (4 \cdot M(i,j) + S_{max} + S_{min}) \geq \frac{3}{8}\sum_{i=0}^{7} S_n \\ S_{min} & \text{otherwise} \end{cases} \quad (C)$$

$$\theta(i,j) = S_d \cdot 22.5°$$

Figure 2:
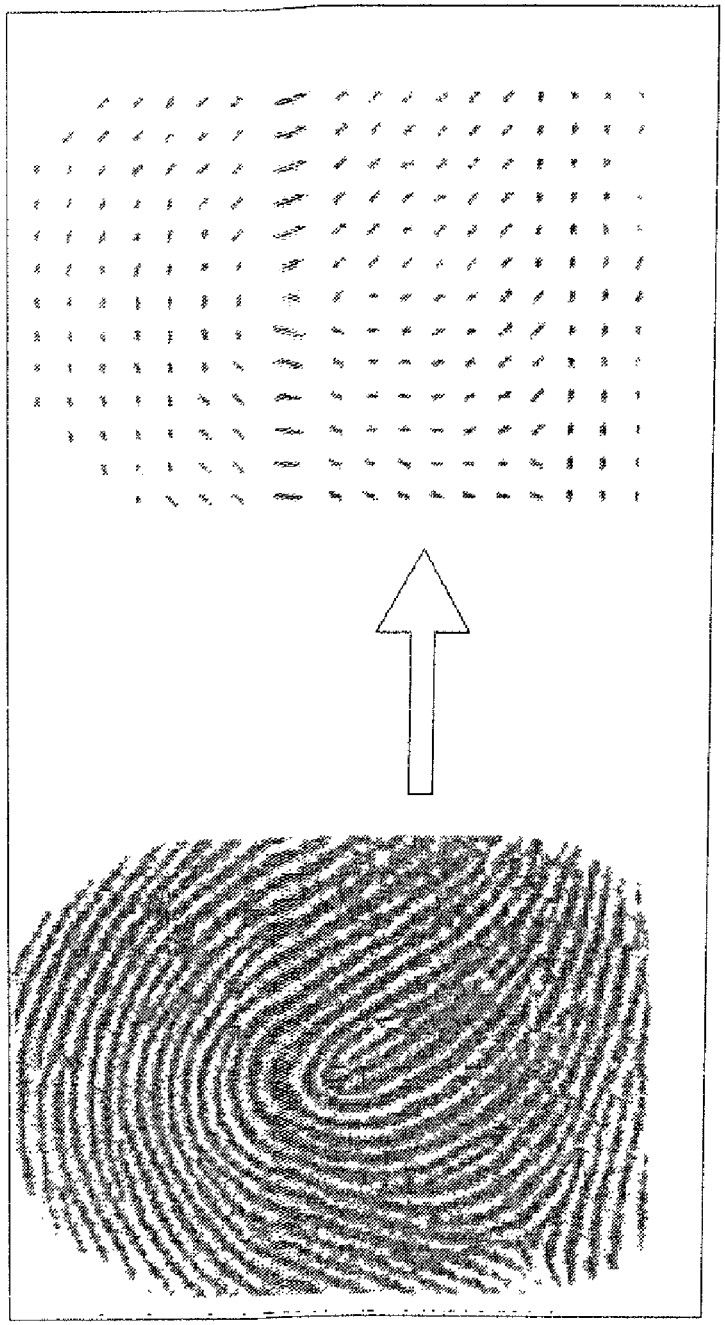
FIG. 2 is a result comparing diagram before and after the fingerprint processing in accordance with the present invention.

Every fingerprint direction of fingerprint in part can be learned from the processor after its obtaining the angle at each point as shown in the FIG. 2; it is the direction of ridge in part for the fingerprint direction minutiae extracted from the original image of fingerprint.

Figure 3:
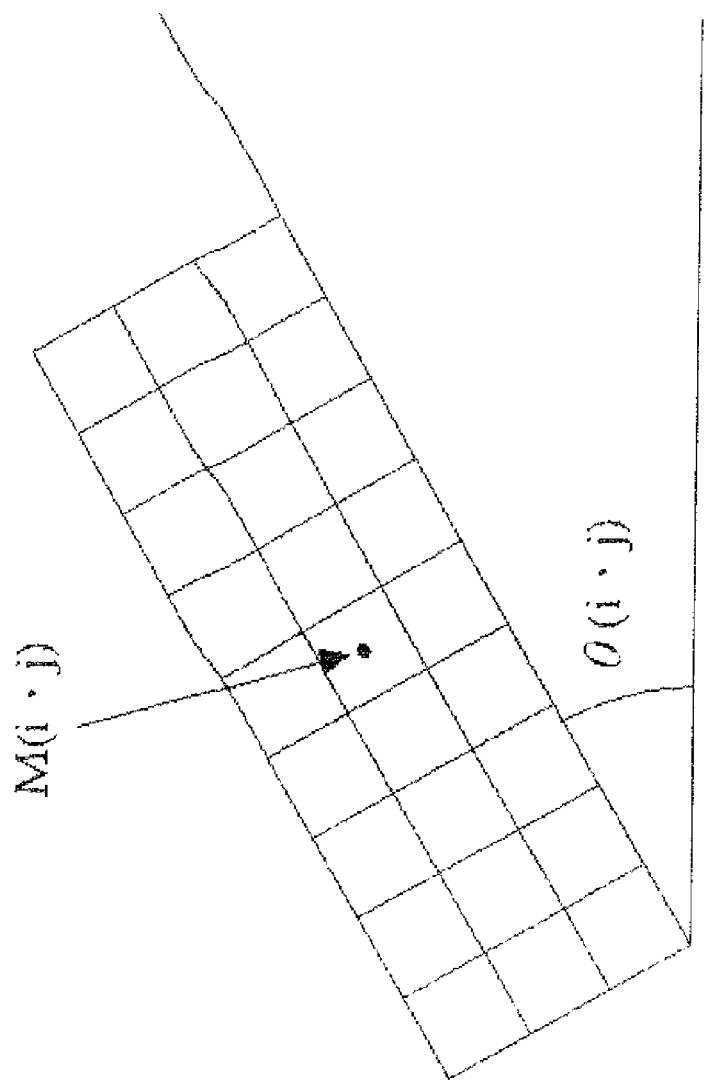
FIG. 3 is a schematic diagram of mask filtering applied in accordance with the present invention.

Step 2: Linear filtering of composite filtering, the aforementioned linear filtering of composite filtering is to perform the filtering operation by the processor on the fingerprint image that has been determined the direction of fingerprint in accordance with the convolution line in the fingerprint direction of fingerprint ridges at the spatial filter; wherein, thereof mask filtering operation is shown in the FIG. 3 as the preferred embodiment by taking the coefficients 9×3 as the filtering mask to proceed the transformation of interpretation for the numerical values at each point in order to save the filtering time and memory space; and the definition equations of linear mask filter are as follows:

$$W = \begin{bmatrix} 0 & 0 & 0 & 0 & 0 & 0 & 0 & 0 & 0 \\ 1 & 1 & 0 & 1 & 0 & 1 & 0 & 1 & 1 \\ 0 & 0 & 0 & 0 & 0 & 0 & 0 & 0 & 0 \end{bmatrix} \quad (D)$$

$$K = \sum_{u=0}^{2n+1} \sum_{v=0}^{2m+1} W(u,v) \quad (E)$$

$$i' = i + ((u - (n+1)) \cdot \cos\theta(i,j) + (v - (m+1))\sin\theta(i,j)) \quad (F)$$

$$j' = j + (-(u - (n+1)) \cdot \sin\theta(i,j) + (v - (m+1))\cos\theta(i,j))$$

$$\overline{M}(i,j) = \frac{1}{K}\sum_{u=0}^{2n+1}\sum_{v=0}^{2m+1} (W(u,v) \times M(i',j')) \quad (G)$$

Where, W in (D) equation is the definition of linear filtering mask, K in (E) equation is the summation of the mask factor in W while the filtering result $\overline{M}(i,j)$ can be obtained from the equation (F) and equation (G) in accordance with the fingerprint direction angle $\theta(i,j)$ gained from the step 1; as a result of the addition of fingerprint direction into the filtering factor in the step of linear filtering, the broken lines of fingerprint can be mended while the connecting of parallel ridges can be avoided as purposed due to the addition of the fingerprint direction factor; meanwhile, an excellent reconstruction effect for the broken ridges is obtainable with a low operation volume and ease of operation.

Step 3: Rhombus filtering of composite filtering, the aforementioned rhombus filtering of composite filtering is to perform the filtering operation at the processor on the fingerprint image that has been processed the linear filtering in accordance the convolution direction of fingerprint ridges at rhombus spatial filer; wherein, the filtering mask with a coefficient of 9×3 is taken for the mask filtering of rhombus spatial filter to follow to proceed the transformation of interpretation of numerical values at each point so as to heighten the contrast between the ridge line and the valley line along the vertical direction of ridge; where the definition equations of the rhombus mask filtering treatment are as follows:

$$W = \begin{bmatrix} 0 & 0 & 4 & 10 & 14 & 10 & 4 & 0 & 0 \\ 10 & 0 & 4 & 0 & 1 & 0 & 4 & 0 & 10 \\ 0 & 0 & 4 & 10 & 14 & 10 & 4 & 0 & 0 \end{bmatrix} \quad (H)$$

$$K = \sum_{u=0}^{2n+1} \sum_{v=0}^{2m+1} W(u, v) \quad (I)$$

$$i' = i + ((u - (n+1)) \cdot \cos\theta(i, j) + (v - (m+1))\sin\theta(i, j)) \quad (J)$$
$$j' = j + (-(u - (n+1)) \cdot \sin\theta(i, j) + (v - (m+1))\cos\theta(i, j))$$

$$\overline{M}(i, j) = \frac{1}{K} \sum_{u=0}^{2n+1} \sum_{v=0}^{2m+1} (W(u, v) \times M(i', j')) \quad (K)$$

Figure 4:
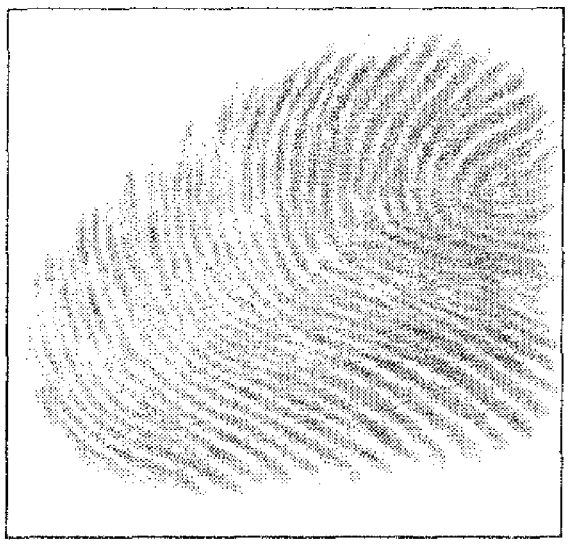
FIG. 4 is a result comparing diagram before and after the fingerprint image enhancement and binarizing in accordance with the present invention.
Figure 4:
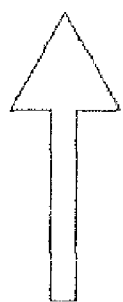
Figure 4:

Where, W in (H) equation is the definition of rhombus filtering mask, K in (I) equation is the summation of the mask factor in W while the filtering result $\overline{M}(i,j)$ can be obtained from the equation (J) and equation (K) in accordance with the fingerprint direction angle $\theta(i,j)$ gained from the step 1; as a result of the addition of fingerprint fingerprint direction into the filtering factor in the step of rhombus filtering, the broken valley lines of fingerprint can be mended while thereof contamination can be ridded of so as to heighten the effectiveness of differentiation between the ridge line and the valley line; a preferred embodiment for image enhancement obtained after performing the composite filtering operation on the original image of fingerprint is shown in the FIG. 4.

Step 4: Binarizing, the aforementioned binarizing is to perform the operation of binarizing for the fingerprint image that has been processed by step 2 and step 3 for enhancement by the processor so that an immediate and noticeable image enhancement is achievable for thereof subsequent image comparison. The numerical equations for the operation of binarizing with the dynamic thresholds used are as follows:

$$T(i, j) = \left( \sum_{x=-r}^{n} \sum_{y=-n}^{n} M(i+x, j+y) \right) \div (2n+1)^2 \quad (L)$$

$$\overline{M}(i, j) = \begin{cases} 255, & \text{if } M(i, j) > T(i, j) \\ 0, & \text{if } M(i, j) \leq T(i, j) \end{cases} \quad (M)$$

Since the single binarized threshold is not used for the binarizing of dynamic threshold, therefore, the influence from an uneven pressing pressure is weakened; wherein, T(i, j) in (L) equation is the threshold defined in accordance with the distribution of Gray Scale value at point (i,j) and points around thereof periphery; $\overline{M}(i,j)$ in (M) equation is the result of binarizing determined in accordance with the threshold T(i,j) at each point.

Figure 5:
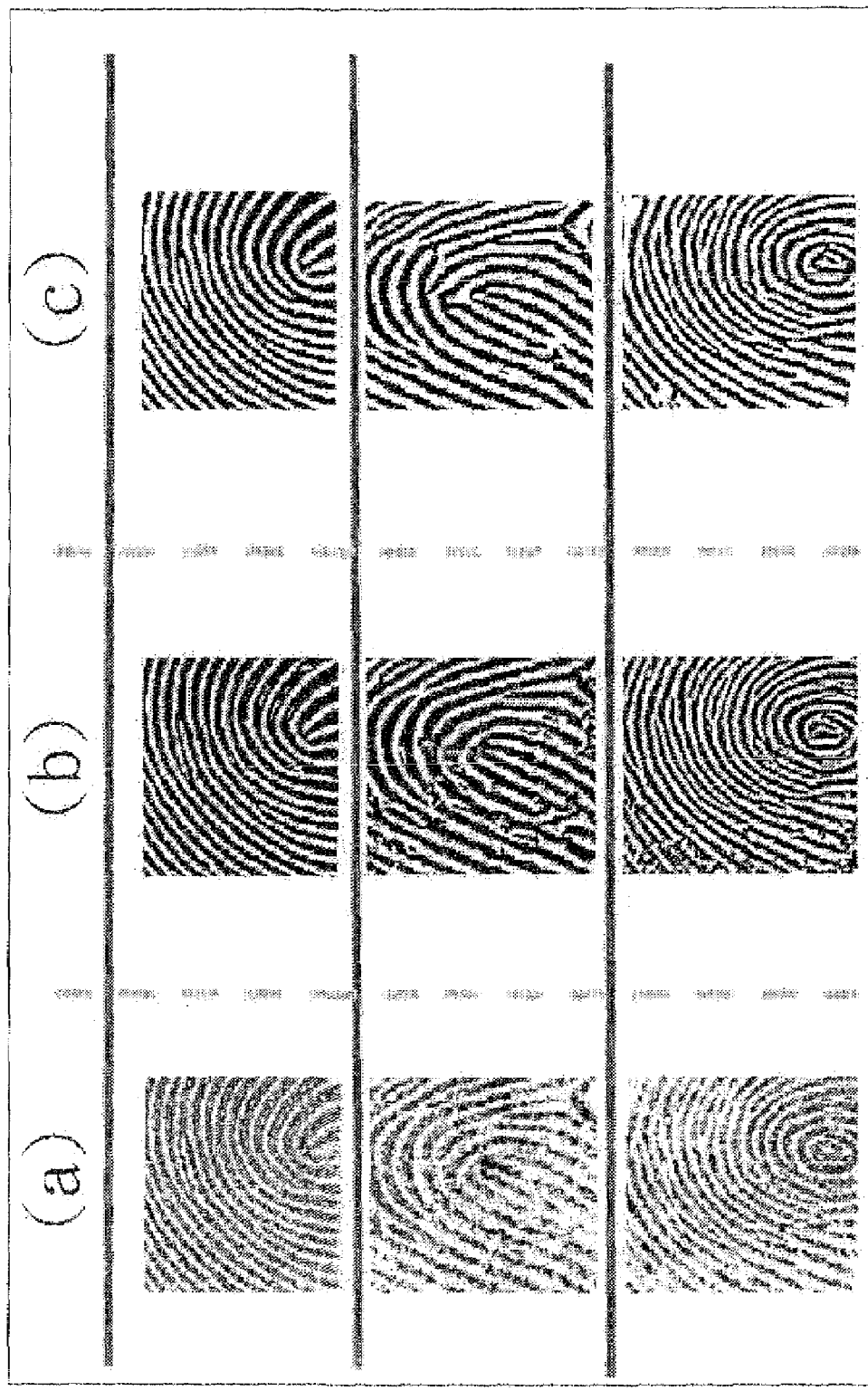
FIG. 5 is a result comparing diagram between the fingerprint image enhanced by the present invention and the fingerprint image processed by the prior art.
Figure 6:
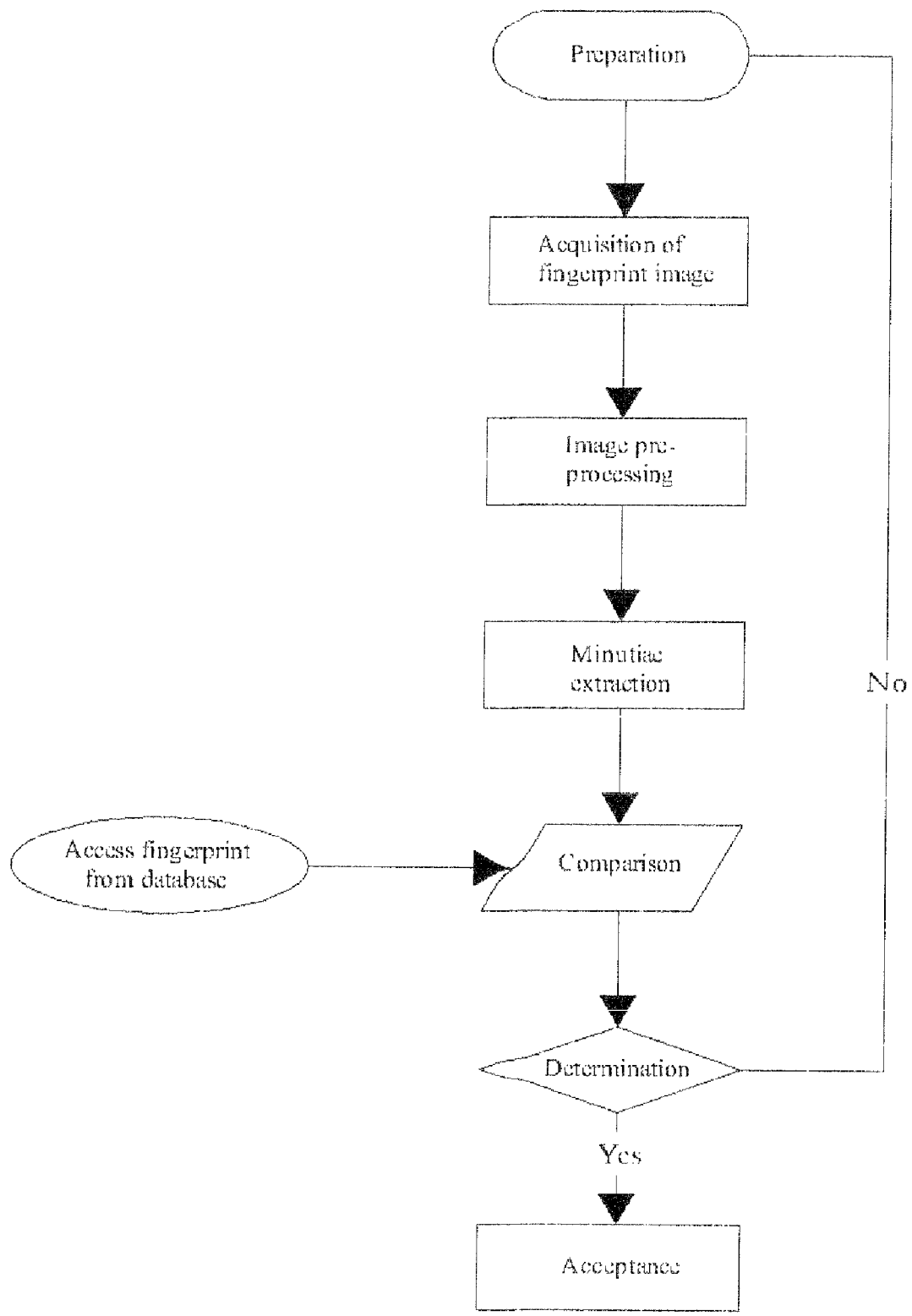
FIG. 6 is a procedures flowchart of an auto fingerprint recognition system.

The primary features of the present invention is attained by dividing the connection of broken lines and the noise filtering for the Gray-Scale image of fingerprint into two steps: the linear filtering and the rhombus filtering; wherein, these two orientation-based composite filtering method are to take the advantage of simple operation from the filters that can achieve an excellent effect of image enhancement and avoid the misinterpretation of the minutiae; that is, the fingerprint image-processing method, with the advantages characterized from the linear filter for its high connectivity and the rhombus filter for its mendability against incompleteness as an approach for image enhancement, is able to effectively mend the broken ridges and the incomplete fingerprint, etc. defects caused by unnatural causes; for instance, a defective fingerprint made by a pressing of a dry fingers; a further explanation in this regard was made by making a comparison diagram for the imaging difference between the conventional technology and the method proposed by the present invention as shown in the FIG. 5, wherein, FIG. 5(*a*) shows three original fingerprint diagram that are randomly selected, FIG. 5(*b*) shows the result after proceeding the traditional filtering operation in frequency domain while FIG. 5(*c*) shows the images after being performed the binarizing and minutiae extraction from the composite filtering operation of the present invention; it goes without saying the superiority of image enhancement made by the operation from the present invention;

Furthermore, the theoretical value of the filtering mask coefficient used by the present invention is 9×3 size; however, using a mask less than 9×3 is applicable for practical design; thus, the filtering time and memory space can be significantly saved while the time spent and storage space occupied for image enhancement can be lessened largely.

What is claimed is:

1. A high-performance fingerprint image-processing method comprising the following steps:

determining the fingerprint direction being to apply numerical equations within a processor to further read and determine the fingerprint direction in part of characteristic ridges from a collected Gray-Scale image of an original fingerprint;

linear filtering of composite filtering being to apply definition equations of linear mask filter within the processor and to rotate a linear spatial filter within the processor based on the determined fingerprint direction in part to perform a filtering operation at each point on the collected fingerprint image;

rhombus filtering of composite filtering being to apply definition equations of rhombus mask filter within the processor and to rotate a rhombus spatial filter within the processor based on the fingerprint direction of the fingerprint image, which has been linear filtered to perform a filtering operation at each point on the collected fingerprint image; and binarizing being to perform a binarizing operation for the fingerprint image that has been rhombus filtered by the processor in order to demonstrate the effect of image enhancement;

wherein the linear spatial filter and the rhombus spatial filter within the processor apply a filtering mask with a coefficient 9×3 to perform the mask filtering operation;

wherein the definition equations of linear mask filtering applied in the linear filtering of composite filtering step are:

$$W = \begin{bmatrix} 0 & 0 & 0 & 0 & 0 & 0 & 0 & 0 & 0 \\ 1 & 1 & 0 & 1 & 0 & 1 & 0 & 1 & 1 \\ 0 & 0 & 0 & 0 & 0 & 0 & 0 & 0 & 0 \end{bmatrix}$$

$$K = \sum_{u=0}^{2n+1} \sum_{v=0}^{2m+1} W(u, v)$$

$$i' = i + ((u - (n+1)) \cdot \cos\theta(i, j) + (v - (m+1))\sin\theta(i, j))$$
$$j' = j + (-(u - (n+1)) \cdot \sin\theta(i, j) + (v - (m+1))\cos\theta(i, j))$$

$$\overline{M}(i, j) = \frac{1}{K} \sum_{u=0}^{2n+1} \sum_{v=0}^{2m+1} (W(u, v) \times M(i', j'))$$

wherein, W is the definition of linear filtering mask, K is the summation of the mask coefficients in W, $\overline{M}(i, j)$ is the filtering result at the corresponding point, $\theta(i, j)$ is the fingerprint direction angle of each point, (i, j) is the point on the collected fingerprint image M, (i', j') is the point obtained in accordance with the point (i, j) filtered by the linear filtering, m, n, u and v are integers.

2. The high-performance fingerprint image-processing method as claimed in claim 1; wherein the definition equations of rhombus mask filtering applied in the rhombus filtering of composite filtering step are:

$$W = \begin{bmatrix} 0 & 0 & 4 & 10 & 14 & 10 & 4 & 0 & 0 \\ 10 & 0 & 4 & 0 & 1 & 0 & 4 & 0 & 10 \\ 0 & 0 & 4 & 10 & 14 & 10 & 4 & 0 & 0 \end{bmatrix}$$

$$K = \sum_{u=0}^{2n+1} \sum_{v=0}^{2m+1} W(u, v)$$

$$i' = i + ((u - (n+1)) \cdot \cos\theta(i, j) + (v - (m+1))\sin\theta(i, j))$$

$$j' = j + (-(u - (n+1)) \cdot \sin\theta(i, j) + (v - (m+1))\cos\theta(i, j))$$

$$\overline{M}(i, j) = \frac{1}{K} \sum_{u=0}^{2n+1} \sum_{v=0}^{2m+1} (W(u, v) \times M(i', j'))$$

wherein, W is the definition of rhombus filtering mask, K is the summation of the mask coefficients in W, $\theta(i, j)$ is the fingerprint direction angle of each point, $\overline{M}(i, j)$ is the filtering result at the corresponding point, (i, j) is the point on the collected fingerprint image M, (i', j') is the point obtained in accordance with the point (i, j) filtered by the rhombus mask filtering, m, n, u and v are integers.

3. The high-performance fingerprint image-processing method, as claimed in claim 1, wherein the definition of numerical equations applied in the determining the fingerprint direction step are:

$S_0 = M(i,j+4) + M(i,j+2) + M(i,j-2) + M(i,j-4)$ $S_1 = M(i-2,j+4) + M(i-1,j+2) + M(i+1,j-2) + M(i+2,j-4)$ $S_2 = M(i-4,j+4) + M(i-2,j+2) + M(i+2,j-2) + M(i+4,j-4)$ $S_3 = M(i-4,j+2) + M(i-2,j+1) + M(i+2,j-1) + M(i+4,j-2)$ $S_4 = M(i-4,j) + M(i-2,j) + M(i+2,j) + M(i+4,j)$ $S_5 = M(i-4,j-2) + M(i-2,j-1) + M(i+2,j+1) + M(i+4,j+2)$ $S_6 = M(i-4,j-4) + M(i-2,j-2) + M(i+2,j+2) + M(i+4,j+4)$ $S_7 = M(i-2,j-4) + M(i-1,j-2) + M(i+1,j+2) + M(i+2,j+4)$ wherein, M(i,j) are the Gray Scale value at each point in the fingerprint image M while the $S_0$, $S_1$, K, $S_7$ are the summation of Gray Scale value in each direction; also, $S_{max}$ and $S_{min}$ express the maximum and the minimum sum of Gray Scale values in every direction as shown in the following equations:

$$S_{max} = \max_{n=0,K,7} S_n \quad n = 0, K, 7$$

$$S_{min} = \min_{n=0,K,7} S_i \quad n = 0, K, 7$$

and according to the results from the foregoing computation, the fingerprint direction & minutiae of fingerprint at each point can be determined, and then applied to the following equations to calculate the angle $\theta(i, j)$ at point (i, j):

$$S_d = \begin{cases} S_{max} & \text{if } (4 \cdot M(i, j) + S_{max} + S_{min}) \geq \frac{3}{8}\sum_{i=0}^{7} S_n \\ S_{min} & \text{otherwise} \end{cases}$$

$$\theta(i, j) = S_d \cdot 22.5°$$

wherein, $S_d$ is a correct direction determined in accordance with the M(i, j), $S_{max}$ $S_{min}$ at the point (i, j).

4. The high-performance fingerprint image-processing method as claimed in claim 1; wherein the binarizing step applies numerical equations for binarizing operation with the dynamic thresholds which are:

$$T(i, j) = \left(\sum_{x=-r}^{n} \sum_{y=-n}^{n} M(i+x, j+y)\right) \div (2n+1)^2$$

$$\overline{M}(i, j) = \begin{cases} 255, & \text{if } M(i, j) > T(i, j) \\ 0, & \text{if } M(i, j) \leq T(i, j) \end{cases}$$

wherein, T(i, j) is the threshold defined in accordance with the distribution of Gray Scale value at point (i, j) and points around thereof periphery; $\overline{M}(i, j)$ is the result of binarizing determined in accordance with the threshold T(i, j) at each point, M(i,j) are the Gray Scale values at each point in the fingerprint image M, n, x, r and y are integers.

* * * * *